(12) United States Patent
Lu et al.

(10) Patent No.: US 7,462,668 B2
(45) Date of Patent: Dec. 9, 2008

(54) LOW VOC-SOLVENT BASED MOLD RELEASE AGENT AND CURABLE MOLD RELEASE COMPOSITIONS BASED THEREON

(75) Inventors: Zheng Lu, Brentwood, NH (US); Randy Lee Smith, Newfields, NH (US); Tamara Lynn Harmar, Kingston, NH (US); Daniel I. Shaw, Middletown, CT (US)

(73) Assignee: Henkel Corporation, Rocky Hill, CT (US)

( * ) Notice: Subject to any disclaimer, the term of this patent is extended or adjusted under 35 U.S.C. 154(b) by 285 days.

(21) Appl. No.: 10/565,499

(22) PCT Filed: Jul. 20, 2004

(86) PCT No.: PCT/US2004/023397

§ 371 (c)(1),
(2), (4) Date: Jan. 23, 2006

(87) PCT Pub. No.: WO2005/012431

PCT Pub. Date: Feb. 10, 2005

(65) Prior Publication Data

US 2006/0247368 A1   Nov. 2, 2006

(51) Int. Cl.
*C08L 83/04* (2006.01)
*B32B 27/00* (2006.01)

(52) U.S. Cl. .................... 524/588; 524/860
(58) Field of Classification Search .............. 524/560
See application file for complete search history.

(56) References Cited

U.S. PATENT DOCUMENTS

| 3,883,628 | A | * | 5/1975 | Martin ............... 264/54 |
|---|---|---|---|---|
| 4,251,277 | A | * | 2/1981 | Martin ............... 106/38.22 |
| 5,000,861 | A | * | 3/1991 | Yang ............... 428/391 |
| 5,187,015 | A | | 2/1993 | Yorkgitis et al. ........ 428/447 |
| 5,217,651 | A | * | 6/1993 | Nagaoka ............... 252/519.2 |
| 5,681,914 | A | * | 10/1997 | Kobayashi et al. ........ 528/18 |
| 5,723,526 | A | * | 3/1998 | Nagasawa ............... 524/451 |
| 5,861,458 | A | * | 1/1999 | Naganawa et al. ........ 524/837 |
| 5,880,227 | A | * | 3/1999 | Kobayashi et al. ........ 525/477 |
| 5,886,111 | A | * | 3/1999 | Chiotis et al. ............... 525/478 |
| 6,057,405 | A | * | 5/2000 | Wengrovius et al. ....... 525/477 |
| 6,174,966 | B1 | * | 1/2001 | Kobayashi et al. ........ 525/464 |
| 6,294,007 | B1 | * | 9/2001 | Martin ............... 106/38.22 |
| 6,322,850 | B1 | * | 11/2001 | Stephens et al. ........... 427/133 |
| 6,403,105 | B1 | | 6/2002 | Stein ............... 424/400 |
| 6,406,792 | B1 | * | 6/2002 | Briquet et al. ............ 428/447 |
| 6,512,072 | B1 | * | 1/2003 | Gantner et al. ............ 528/34 |
| 2004/0235683 | A1 | * | 11/2004 | Moffett ............... 508/202 |

FOREIGN PATENT DOCUMENTS

JP   06-88025   3/1994

* cited by examiner

*Primary Examiner*—Randy Gulakowski
*Assistant Examiner*—Robert Loewe
(74) *Attorney, Agent, or Firm*—Steven C. Bauman

(57) ABSTRACT

The present invention relates to curable mold release compositions containing a non-volatile organic (non-VOC), or low-volatile organic (low-VOC), component employed as a carrier for a curable component. When applied as a coating the mold release compositions cure to a finish having a high durability that is sustained throughout multiple releases.

4 Claims, 1 Drawing Sheet

LOW VOC-SOLVENT BASED MOLD RELEASE AGENT AND CURABLE MOLD RELEASE COMPOSITIONS BASED THEREON

FIELD OF THE INVENTION

This invention generally relates to moisture and/or heat curing mold release compositions containing a low-volatile organic ("low-VOC") or non-volatile organic ("non-VOC") component useful as a carrier for active components. More particularly, the present invention relates to mold release compositions, curable by exposure to moisture and/or heat, comprising a non-VOC, or low-VOC, carrier component and a curable component, which when applied as a coating cures to a finish having a high durability permitting multiple releases.

BACKGROUND OF THE INVENTION

In recent years, the use of volatile organic compound ("VOC") solvent systems has been discouraged due to their deleterious effect on the environment. Regulations have been promulgated not only in the United States but in countries throughout the world to accelerate the phase-out of environmentally destructive solvents. In addition to laws designed to prevent the use of these substances, product labeling requirements have also been promulgated to insure notice is given as to those compounds used as alternatives. Finding acceptable alternatives, however, has been an extremely difficult task. For example, in applications such as mold release compositions, the solvent must have low toxicity and a low VOC content, yet be sufficiently volatile to provide a good evaporation window for the resin cure time. In addition to these requirements, consideration must be given to cost factors, which are important for commercial feasibility.

In the U.S., the Environmental Protection Agency ("EPA") promulgates rules and regulations regarding environmental concerns such as VOCs. EPA has defined a VOC to include any volatile compound of carbon which participates in atmospheric photochemical reactivity and which is not specifically exempted by the rules. See 40 C.F.R. § 51.100(s). Photochemical reactivity is the tendency to participate in reactions in the atmosphere that lead to ozone formation. This is ground-level ozone, also known as the main component in urban smog. Urban smog deleteriously impacts both human health and plant life, and thus, EPA increasingly regulates VOC emissions.

VOC emissions are produced by a number of various sources, one of which is the use of organic solvents classified as VOCs. As such, there is a need to reduce the use of conventional VOC solvents as carriers in solvent systems. It is apparent, therefore, that a need exists for a solvent system which has little or no VOC content yet has sufficient volatility for use as a carrier for active ingredients, such as moisture and/or heat curable components, as well as low in toxicity and affordable in cost.

The present invention overcomes problems associated with conventional VOC solvent systems for mold release compositions by employing non- or low-VOC solvents. Non-VOC solvents include certain of those removed from EPA's definition of a VOC because the compounds exhibit no or negligible photochemical reactivity. These compounds are exempt from EPA's definition of a VOC, and thus, are referred to as non-VOCs. In addition, non-VOCs may be combined with conventional VOC solvents to form low-VOC compositions. A typical mold release agent contains more than 90% by weight of inert organic carrier. Therefore, it is environmentally important to reduce or eliminate VOCs in release coating compositions.

SUMMARY OF THE INVENTION

The present invention is directed to moisture and/or heat curable mold release compositions, as well as methods for preparing such compositions and applying such compositions to form mold release coatings. Curable mold release compositions of the present invention include a non-volatile organic (non-VOC) carrier composition; and a curable component containing a combination of at least one cross-linker and at least one polyfunctional siloxane. When applied as a coating, the mold release composition cures to a durability which permits at least five releases without transfer of mold release composition to a part.

In other embodiments of the present invention, the curable mold release compositions include a low-volatile organic (low-VOC) carrier composition, which contains a combination of a non-VOC carrier and a VOC carrier, and a curable component containing a combination of at least one cross-linker and at least one polyfunctional siloxane.

The methods of the present invention for preparing curable release compositions include the steps of providing a carrier composition; and mixing the carrier composition with a curable composition including at least on cross-linker and at least one polyfunctional siloxane.

The present invention is also directed to methods of preparing mold release coatings. Such methods include the steps of applying a mold release composition, which contains a carrier composition including a compound selected from branched, linear or cyclic siloxanes having 2-6 silicon atoms, branched, linear or cyclic fluorinated alkanes, and combinations thereof; and a curable component which includes a combination of at least one cross-linker and at least one polyfunctional siloxane; and allowing the composition to cure.

DETAILED DESCRIPTION OF THE INVENTION

Figure 1:
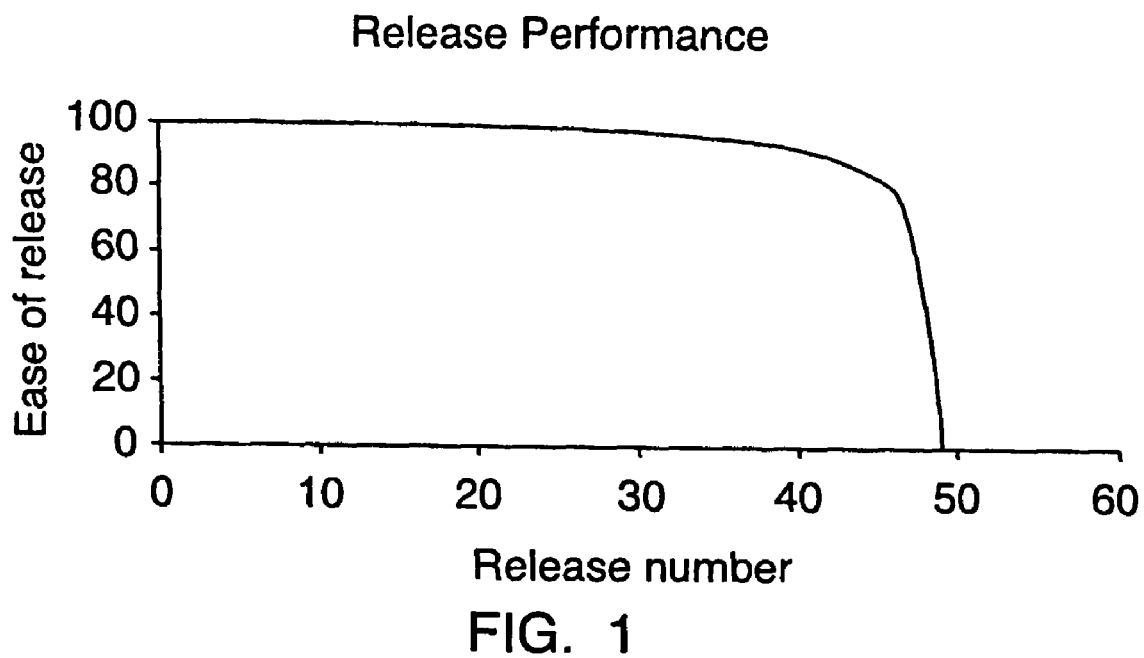
FIG. 1 is a graphical representation of release performance of a curable mold release composition of the present invention.

The present invention is directed to moisture and/or heat curing mold release compositions that are durable and permit multiple releases when applied as a coating, as well as methods for preparing such compositions. These compositions additionally may provide a high gloss finish when applied as a coating. The mold release compositions of the present invention contain a non-VOC, or low-VOC, carrier component, thus reducing environmental problems caused by conventional VOC-containing solvent systems. The compositions also contain a curable active component, which may be moisture and/or heat curable, and which desirably includes at least one cross-linker and at least one hydroxy-functional siloxane.

The term "cure" or "curing," as used herein, refers to a change in state, condition, and/or structure in a material that is usually, but not necessarily, induced by at least one variable, such as time, temperature, moisture, radiation, presence and quantity in such material of a curing catalyst or accelerator, or the like. The terms cover partial as well as complete curing.

The curable mold release compositions of the present invention desirably are formed from a combination of a non-VOC carrier component and a moisture and/or heat curing component. Desirable non-VOC carriers include siloxane compounds, which may be branched, linear, or cyclic; or fluorinated alkane compounds, which also may be branched linear, or cyclic; and combinations thereof.

Other useful non-VOC carriers include those non-reactive solvents that are environmentally friendly selected from the compounds listed by EPA as exempt from the definition of a Volatile Organic Compound in 40 C.F.R. § 51.100, which is hereby expressly incorporated herein by reference in its entirety. It would be understood by those of ordinary skill in the art which solvents from EPA's list are non-reactive and environmentally friendly, and thus, would be suitable for use in the compositions of the present invention. In addition, solvents having a vapor pressure of less than 0.1 mm Hg, which are non-volatile, also are considered non-VOC solvents for purposes of the present invention.

In accordance with the present invention, non-VOC solvents may be employed alone or in combination with other non-VOC solvents. In addition, it may be desirable to blend non-VOC solvents with VOC solvents as they evaporate slowly, thereby forming low-VOC carrier compositions.

Desirable room temperature evaporation rates for the solvents employed in the present invention are greater than about 0.01, more particularly ranging from about 0.01 to about 1,000,000 (butyl acetate=100). Aerosol repellent carriers commonly have evaporation rates higher than about 2,000 (butyl acetate=100), and other common solvent carriers have evaporation rates less than about 6,000 (butyl acetate=100). The carrier evaporation rate is determined by application and curing speed of the coating formulation. For instance, fast evaporating carriers may be preferred for room temperature applications, while slower evaporating carriers may be selected for higher temperature applications. Moreover, the evaporation rate of carriers also impacts the curing speed of the coating formulation.

In general, siloxane compounds contain silicon, oxygen, and usually carbon and hydrogen atoms. For purposes of the present invention, any methylated siloxane compound having 2-6 silicon atoms, such as methylated di-, tri-, tetra- and penta-siloxanes, may be useful as the non-VOC carrier component. The methylated siloxanes may be linear, branched, or cyclic compounds. Examples of specific siloxane compounds that may be used as carriers in accordance with the present invention include, but are not limited to: hexamethyldisiloxane, octamethyltrisiloxane, cyclotetrasiloxane, octamethylcyclotetrasiloxane, decamethyltetrasiloxane, decamethylcyclopentasiloxane and combinations thereof.

Also useful as non-VOC carrier components in accordance with the present invention are fluorinated alkanes. Similar to methylated siloxanes, these compounds also may be linear, branched, or cyclic. Examples of specifically useful fluorinated alkanes include, but are not limited to: 1,1,1,2-tetrafluoroethane and completely fluorinated alkane compounds.

Non-VOC carriers are present in the curable mold release compositions, for example, in an amount from about 1% to about 99.8% by weight of the total composition (w/w). Desirably, the non-VOC carrier is present in an amount from about 90% to about 99.8% w/w.

In some embodiments of the present invention, the mold release composition may contain a carrier composition that is a combination of a non-VOC carrier and a VOC carrier, thereby providing a low-VOC carrier composition, as described above. The VOC carrier component may be any conventional VOC solvent used in mold release compositions, such as, for example, $C_7$ to $C_{13}$ aliphatic or aromatic solvents or mixtures thereof. The VOC carrier may be present in amounts from about 0 to about 95% w/w.

The mold release compositions of the present invention also include a curable component, which is moisture and/or heat curable. Desirably, the curable component contains a combination of at least one cross-linking compound and at least one hydroxy-functional siloxane. For purposes of the present invention, the hydroxy-functional siloxane may be a polyfunctional siloxane. In particular, the polyfunctional siloxane may be one or more compounds of the following formula I:

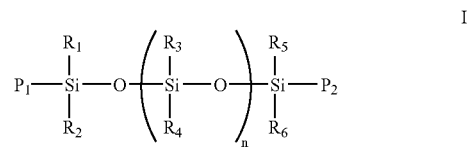

where $R_1$, $R_2$, $R_3$, $R_4$, $R_5$, and $R_6$ may be the same or different and may be alkyl, aromatic hydrocarbon, organoamine, fluorinated hydrocarbon, organo-alkoxy, hydro, organo-mercapto, organo-chloro, organo-cyano, or allyl; $P_1$ and $P_2$ may be the same or different and may be alkyl, hydroxyl, hydro, allyl, carbinol, amino, acetoxy, alkoxy, enoxy, or oxime groups; and wherein n is from 0 to about 100,000. Interruption of the polymer chain by a hetero atom is also within the scope of the present invention.

An example of a specific polyfunctional siloxane that may be used to form the above structure is hydroxy terminated polydimethylsiloxane, as represented by formula II:

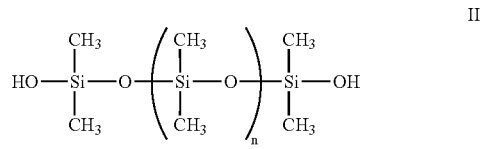

The number of repeating units, "n", plays a role in determining the molecular weight and viscosity of the composition. Desirably, polydimethylsiloxanes incorporated into the mold release compositions of the present invention have a molecular weight of about 200 to about 400,000. Viscosity of the hydroxy terminated siloxane desirably ranges from about 50 to about 2,000,000 cps at room temperature. Hydroxy terminated siloxanes are present in the mold release compositions, for example, in an amount from about 0.01% to about 10% w/w.

The moisture and/or heat curable component also includes a cross-linking agent. Cross-linking is the attachment of two or more chains of polymers by, for example, bridges and cross bridges, comprising either an element, a group, or a compound. Suitable agents may be selected from a variety of crosslinkers, such as, but not limited to: a monomeric, cyclic, oligomeric or polymeric silazane, an amino-functional silazane, an enoxy-functional silazane, a silicon hydride, an alkoxy functional silane, a methylethylketoxime functional silane, an acetoxy functional silane, an enoxy functional silane, an amino-functional silane, and combinations thereof.

More specifically, suitable crosslinkers include, but are not limited to: tris methylamino functional silane, tris enoxy functional silane, hydride functional silane, and cyclic trisilazane.

Cross-linking agents desirably are present in the mold release compositions of the present invention in an amount from about 0.01% to about 10% w/w, more desirably from about 0.01% to about 3% w/w. Moreover, it is desirable that the siloxane carrier component, if present, does not react with the crosslinker component in the compositions of the present invention.

The mold release compositions of the present invention may contain a number of other additives, such as, catalysts, dyes, cure modifying agents, fillers, viscosity modifying agents, and combinations thereof. For example, it may be desirable to include a moisture catalyst to accelerate or otherwise promote the moisture cure process. Any conventional catalyst may be employed provided the mold release properties of the compositions are not compromised. Suitable catalysts that may be used include conventional organometallic catalysts such as organic titanium derivatives and organic tin derivatives, tertiary amine compounds, and certain early transition metal compounds. Generally, the catalyst is present in an amount from about 0 to 1.0% w/w. This concentration, however, may be varied depending upon the desired cure rate.

In accordance with the present invention, the mold release compositions desirably are applied to a part to form a mold release coating. Upon application, the compositions cure at room or elevated temperatures to form the mold release coatings. The application of heat is not necessary in some embodiments of the present invention, however temperature may be used to affect curing speed. Thus, it may be desirable to apply heat, depending upon the components selected. In room temperature curing embodiments, cure time desirably ranges between about 2 minutes and about 48 hours. The cure time may be shortened upon addition of certain appropriate catalysts, as described above.

The compositions desirably cure to a high durability finish that permits a number of releases without contaminating a released part by transfer of the release composition from the mold to the part. In addition, in some embodiments, the coating may desirably cure to a high gloss finish that permits a number of releases without measurable loss of initial gloss value. For example, the compositions of the present invention may cure to a finish having a gloss value of at least 80 as measured by a 60 degree gloss meter. After a number of releases, such as, for example at least five releases, this gloss value remains nearly the same. In addition, the finish remains sufficiently durable after the at least five releases such that the mold release composition has not transferred to the part.

The present invention is also directed to methods for preparing curable mold release compositions and coatings. According to these methods, a carrier composition containing a non-or low-VOC solvent is mixed with a moisture and/or heat curable composition, as defined above. This composition may be applied to a part and then permitted to cure, thereby providing a durable coating. The mold release composition may be applied to the part by any conventional means, such as, but not limited to, wipe-on, spray-on, dipping, and rolling applications. These applications, particularly spray-on, cure to a high gloss with little or no need for buffing. The composition may be allowed to cure at room temperature or with application of heat depending upon the components selected. After curing, the coating permits a number of releases without measurable loss of gloss value or durability.

EXAMPLES

Example 1

This example describes a formulation of components used to make a curable mold release composition of the present invention. Table 1 depicts the weight percent of each of the following components in the composition: tris methylamino functional silane; hydroxy functional siloxanes; $C_7$-$C_{10}$ aliphatic solvents; and cyclic or linear methylated siloxanes. This combination formed a high gloss, room temperature moisture curing application.

TABLE 1

| Component | wt. % |
| --- | --- |
| Tris methylamino functional silane | 0.01-2 |
| Hydroxyl functional siloxanes | 0.02-8 |
| $C_7$-$C_{10}$ aliphatic solvents | 1-60 |
| Cyclic/linear methylated siloxanes | 60-99 |

The following gloss measurements were taken for the composition defined in Table 1: the clean mold; the mold after four coats of the release composition were applied; and the released part. The gloss measurements were obtained with a 60 degree gloss meter. Table 2 depicts the results, showing high gloss levels, which are all above 80.

TABLE 2

| | Clean Mold | Mold After Four Coats | Released Part |
| --- | --- | --- | --- |
| Gloss Number | 87.4 | 84.1 | 83.9 |

The release performance for this composition also was evaluated. In FIG. 1, release performance of this composition is depicted as release number as a function of ease of release. Ease of release was evaluated by observing the force needed to remove the part from the mold and assigning a rating based thereon. High ratings meant that essentially no force was needed to remove the part. FIG. 1 shows that the ease of release remained consistently high for about 40-45 releases. If desired, another coating of the release composition could be applied at this point to obtain an additional 40-45 releases.

Example 2

This example describes a formulation of components used to make a curable mold release composition of the present invention. Table 3 depicts the weight percent of each of the following components in the composition: tris methylamino functional silane; cyclic trisilazane; hydroxy functional siloxanes; $C_7$-$C_{10}$ aliphatic solvents; and cyclic or linear methylated siloxanes. This combination formed a high gloss, room temperature moisture curing application.

TABLE 3

| Component | wt. % |
| --- | --- |
| Tris methylamino functional silane | 0.01-0.5 |
| Cyclic tri silazane | 0.01-1 |
| Hydroxyl functional siloxanes | 0.02-8 |
| $C_7$-$C_{10}$ aliphatic solvents | 1-50 |
| Cyclic/linear methylated siloxanes | 40-90 |

For this formulation, gloss numbers were measured for: the clean mold; the mold after four coats of the release composition were applied; and the released part. The gloss measurements were made with a 60 degree gloss meter. Table 4 depicts the results, showing high gloss levels which are all above 80.

TABLE 4

|  | Clean Mold | Mold After Four Coats | Released Part |
|---|---|---|---|
| Gloss Number | 89.2 | 86.5 | 84.5 |

Figure 2:
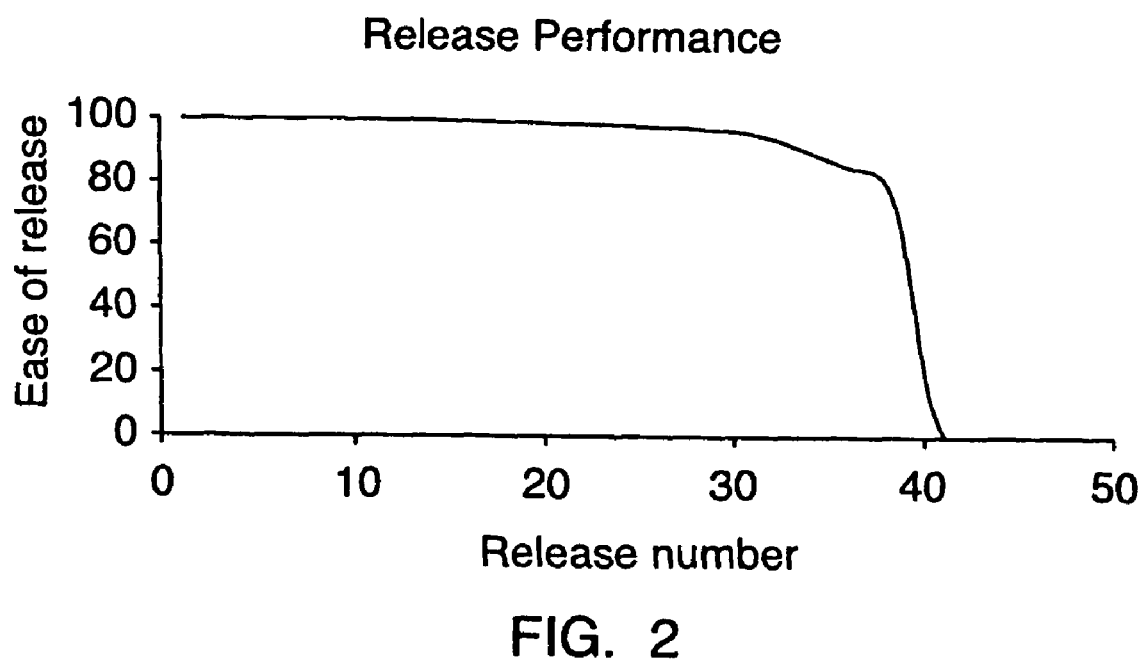
FIG. 2 is a graphical representation of release performance of a curable mold release composition of the present invention.

The release performance for this composition also was evaluated. In FIG. 2, release performance of this composition is depicted as release number as a function of ease of release. Ease of release was evaluated as described above in Example 1. FIG. 2 shows that the ease of release remained consistently high for about 40 releases for this formulation.

Example 3

This example describes a formulation of components used to make a curable mold release composition of the present invention. Table 5 depicts the weight percent of each of the following components in the composition: tris methylamino functional silane; hydroxy functional siloxanes; $C_7$-$C_{11}$ aliphatic solvents; and 1,1,1,2-tetrafluoroethane. This formulation provided an aerosol form of the mold release composition for spray-on applications. In particular, 1,1,1,2-tetrafluoroethane is a non-VOC aerosol propellant.

TABLE 5

| Component | wt. % |
|---|---|
| Tris methylamino functional silane | 0.01-2 |
| Hydroxyl functional siloxanes | 0.05-7 |
| $C_7$-$C_{11}$ aliphatic solvents | 20-80 |
| 1,1,1,2-tetrafluoroethane | 60-99 |

Example 4

This example describes a formulation of components used to make a curable mold release composition of the present invention. Table 6 depicts the weight percent of each of the following components in the composition: tris methylamino functional silane; hydroxy functional siloxanes; cyclic or linear methylated siloxanes; and 1,1,1,2-tetrafluoroethane. This formulation also provided a non-VOC aerosol form of the mold release composition. As described above, 1,1,1,2-tetrafluoroethane is a non-VOC aerosol propellant.

TABLE 6

| Component | wt. % |
|---|---|
| Tris methylamino functional silane | 0.01-2 |
| Hydroxyl functional siloxanes | 0.03-7 |
| Cyclic/linear methylated siloxanes | 10-70 |
| 1,1,1,2-tetrafluoroethane | 20-60 |

Example 5

This example describes a formulation of components used to make a curable mold release composition of the present invention. Table 7 depicts the weight percent of each of the following components in the composition: tris methylamino functional silane; hydroxy functional siloxanes; cyclic or linear methylated siloxanes; and propane. Propane is a VOC propellant. This example provided a non-VOC aerosol formulation.

TABLE 7

| Component | wt. % |
|---|---|
| Tris methylamino functional silane | 0.01-2 |
| Hydroxyl functional siloxanes | 0.02-10 |
| Cyclic/linear methylated siloxanes | 10-70 |
| Propane | 20-60 |

Example 6

This example describes a formulation of components used to make a curable mold release composition of the present invention. Table 8 depicts the weight percent of each of the following components in the composition: polysilazane; tris methylamino functional silane; hydroxy functional siloxanes; and cyclic or linear methylated siloxanes. This formulation provided a high temperature release application.

TABLE 8

| Component | wt. % |
|---|---|
| Polysilazane | 0.01-1 |
| Tris methylamino functional silane | 0.01-1 |
| Hydroxyl functional siloxanes | 0.03-10 |
| Cyclic/linear methylated siloxanes | 90-99 |

Example 7

This example describes a formulation of components used to make a curable mold release composition of the present invention. Table 9 depicts the weight percent of each of the following components in the composition: tris enoxy functional silane; hydroxy functional siloxanes; $C_7$-$C_{11}$ aliphatic solvents; and linear or cyclic methylated siloxanes. This example provided a room temperature moisture curing application containing different crosslinkers.

TABLE 9

| Component | wt. % |
|---|---|
| Tris enoxy functional silane | 0.01-3 |
| Hydroxyl functional siloxanes | 0.02-10 |
| $C_7$-$C_{11}$ aliphatic solvents | 10-50 |
| Linear/cyclic methylated siloxanes | 20-90 |

Example 8

This example describes a formulation of components used to make a curable mold release composition of the present invention. Table 10 depicts the weight percent of each of the following components in the composition: tris enoxy functional silane; hydride functional silane; hydroxy functional siloxanes; tin catalyst; and linear, branched, or cyclic methylated siloxanes. This formulation added a second cure mechanism, i.e., enoxy cure and hydride cure mechanisms.

TABLE 10

| Component | wt. % |
| --- | --- |
| Tris enoxy functional silane | 0.01-3 |
| Hydride functional silane | 0.01-1 |
| Hydroxy functional siloxanes | 0.02-10 |
| Tin Catalyst | 0.01-0.5 |
| Linear/branched/cyclic methylated siloxanes | 80-99 |

Example 9

This example describes a formulation of components used to make a curable mold release composition of the present invention. Table 11 depicts the weight percent of each of the following components in the composition: cyclic trisilazane; hydroxy functional siloxanes; $C_7$-$C_{12}$ aromatic solvents; and completely fluorinated alkanes. This example provided a high temperature curing application.

TABLE 11

| Component | wt. % |
| --- | --- |
| Cyclic trisilazane | 0.05-10 |
| Hydroxyl functional siloxanes | 0.05-10 |
| $C_7$-$C_{12}$ aromatic solvents | 0-40 |
| Completed fluorinated alkanes | 20-90 |

Example 10

This example describes a formulation of components used to make a curable mold release composition of the present invention. Table 12 depicts the weight percent of each of the following components in the composition: cyclic trisilazane; polysilazane; hydroxy functional siloxanes; $C_{12}$-$C_{16}$ aliphatic solvents; and linear, branched, or cyclic methylated siloxanes. The $C_{12}$-$C_{16}$ aliphatic solvents contained in this formulation have a vapor pressure of less than 0.1 mm Hg at 68° F. Thus, this formulation contained all non-VOC solvents.

TABLE 12

| Component | wt. % |
| --- | --- |
| Cyclic trisilazane | 0.04-15 |
| Polysilazane | 0.01-10 |
| Hydroxy functional siloxanes | 0.01-10 |
| $C_{12}$-$C_{16}$ aliphatic solvents | 1-50 |
| Linear/branched/cyclic methylated siloxanes | 1-50 |

What is claimed is:

1. A curable mold release composition comprising: a) a carrier composition comprising a compound selected from the group consisting of branched, linear, or cyclic siloxanes having 2-6 silicon atoms; and b) a curable composition comprising an amino-functional silazane and a polyfunctional siloxane, wherein said carrier is present in amounts of about 90% to about 99.8% by weight of the total composition.

2. The method of claim 1, wherein said polyfunctional siloxane is a hydroxy-terminated polydimethyl siloxane having an average molecular weight of about 200 to about 400,000.

3. The method of claim 1 further comprising a crosslinker selected from the group consisting of a silazane; an amino-functional silane; an enoxy-functional silane; and combinations thereof; and the polyfunctional siloxane is one or more compounds of the formula:

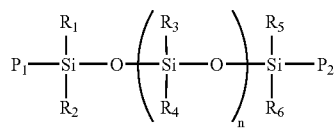

wherein $R_1$, $R_2$, $R_3$, $R_1$, $R_5$, and $R_6$ are the same or different and can be alkyl, aromatic hydrocarbon, organoamine, fluorinated hydrocarbon, organo-alkoxy, hydro, organo-mercapto, organo-chloro, organo-cyano, or allyl; $P_1$ and $P_2$ are the same or different and can be hydroxyl, hydro, or alkoxy; and n is 0 to 100,000.

4. A curable mold release composition comprising:
a) a non-volatile organic (non-VOC) carrier composition selected from the group consisting of branched, linear or cyclic siloxanes having 2-6 silicone atoms; branched, linear or cyclic fluorinated alkanes; and combinations thereof and
b) a curable component comprising a combination of at least one cross-linker selected from the group consisting of a cyclic silazane; an amino-functional silane; a tris enoxy functional silane; and combinations thereof; and
c) a polyfunctional siloxane of the formula:

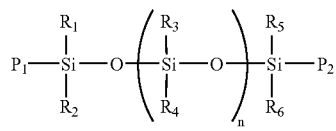

wherein $R_1$, $R_2$, $R_3$, $R_1$, $R_5$, and $R_6$ are the same or different and can be alkyl, aromatic hydrocarbon, organoamine, fluorinated hydrocarbon, organo-alkoxy, hydro, organo-mercapto, organo-chloro, organo-cyano, or allyl; $P_1$ and $P_2$ are the same or different and can be hydroxyl, hydro, or alkoxy; and n is 0 to 100,000;
wherein said mold release composition when applied as a coating cures to a durability which permits at least five releases without transfer of mold release composition to a part.

* * * * *

UNITED STATES PATENT AND TRADEMARK OFFICE
CERTIFICATE OF CORRECTION

PATENT NO.         : 7,462,668 B2                                               Page 1 of 1
APPLICATION NO. : 10/565499
DATED              : December 9, 2008
INVENTOR(S)        : Zheng Lu et al.

It is certified that error appears in the above-identified patent and that said Letters Patent is hereby corrected as shown below:

Column 10, line 21, please delete "$R_1$" (second occurrence) and insert therefor --$R_4$--.

Column 10, line 32, after "thereof", please insert --;--.

Column 10, line 46, please delete "$R_1$" (second occurrence) and insert therefor --$R_4$--.

Signed and Sealed this

Twenty-second Day of September, 2009

David J. Kappos
*Director of the United States Patent and Trademark Office*